United States Patent [19]

Gügel

[11] Patent Number: 4,757,935
[45] Date of Patent: Jul. 19, 1988

[54] METHOD AND DEVICE FOR FLUSHING THE INSIDE SURFACE OF A PIPE IN THE VICINITY OF A WELDED SEAM

[75] Inventor: Siegfried Gügel, Möhrendorf, Fed. Rep. of Germany

[73] Assignee: Kraftwerk Union AG, Mulheim, Fed. Rep. of Germany

[21] Appl. No.: 923,336

[22] Filed: Oct. 27, 1986

[30] Foreign Application Priority Data

Oct. 25, 1985 [DE] Fed. Rep. of Germany ....... 3538089

[51] Int. Cl.$^4$ ............................................. B23K 31/06
[52] U.S. Cl. ...................................... 228/219; 228/20; 228/200; 219/61.7; 219/8.5; 29/463; 239/590.3; 239/488
[58] Field of Search ................. 228/200, 46, 219, 220, 228/222, 42, 20; 219/61.7, 8.5; 239/590.3, 487, 488; 29/463; 285/286

[56] References Cited

U.S. PATENT DOCUMENTS

| 2,061,671 | 11/1936 | Riemenschneider | 228/46 |
| 3,053,967 | 9/1962 | Gorman et al. | 239/590.3 |
| 4,218,604 | 8/1980 | Masaoka et al. | 239/590.3 |
| 4,454,405 | 6/1984 | Riley | 239/590.3 |

FOREIGN PATENT DOCUMENTS 423426  4/1967  Switzerland .................... 239/590.3

Primary Examiner—Nicholas P. Godici
Assistant Examiner—Samuel M. Heinrich
Attorney, Agent, or Firm—Herbert L. Lerner; Laurence A. Greenberg

[57] ABSTRACT

Method for flushing the inside surface of a pipe in the vicinity of a welded seam, where a flushing gas is fed to the pipe with laminar flow, characterized by the feature that the laminar flow in the pipe is transformed into a turbulent flow in front of the welded seam.

13 Claims, 1 Drawing Sheet

METHOD AND DEVICE FOR FLUSHING THE INSIDE SURFACE OF A PIPE IN THE VICINITY OF A WELDED SEAM

BACKGROUND OF THE INVENTION

1. Field of the Invention

The invention relates to a method and apparatus for flushing the inside surface of a pipe in the vicinity of a welded seam where a flushing gas is fed to the pipe with a laminar flow.

2. Description of the Prior Art

Technical installations such as production lines for electronic information carriers require a high degree of protection against impurities so that the reject rate remains low. Even very small particles can lead to production defects. In order to achieve good protection against impurities, the system is acted upon by high purity gas during the entire production. This gas may be, for instance, argon.

Austenitic piping is used, the inside surfaces of which are electro polished, for the supply of high purity gas. The piping is constructed from individual tube sections, elbows, T-sections, and valves which are welded together. In the production of the piping, evaporation residues can get into the pipes in the fabrication of the piping during the welding process and thereby later into the pure gas. In order to prevent this the welding root is protected during the welding in the interior of the pipe against oxidation by flushing with an inert gas, for instance, argon. The inert gases required are relatively expensive.

It has been customary to date to feed in a flushing gas with laminar flow. There, however, the flow velocity of the gas at the weld is reduced by the heat supplied there to such an extent that residues can no longer be flushed away with an economically justifiable volume of flushing gas if the inside diameter of the pipe is larger than about 50 mm. Consequently, evaporation residues of low-melting alloy components are precipitated from the liquid melt bath at the inside wall of the pipe immediately next to the welded seam.

SUMMARY OF THE INVENTION

It is an object of the invention to provide a method for flushing the inside surface of a pipe which makes the precipitation of evaporation residues in the vicinity of the welded seams impossible or at least reduced to a negligible amount.

With the foregoing and other objects in view, there is provided in accordance with the invention a method for flushing the inside surface of a pipe in a welding procedure forming a welded seam joining pipe sections of the pipe which comprises, feeding a flushing gas into the pipe with laminar flow, and transforming the laminar flow into a turbulent flow in front of the welded seam to effect removal by the turbulent flow of flushing gas of evaporation residues escaping from liquid welding material at the seam and produce a pipe with a welded seam substantially free of impurities.

In accordance with the invention there is provided a pipe in a welding procedure forming a welded seam joining pipe sections of the pipe through which a flushing gas is fed with laminar flow and an aerodynamic body for transforming the laminar flow to turbulent flow in the vicinity of the welded seam arranged in front of the welded seam as seen in the flow direction with the distance between the welded seam and the aerodynamic body smaller than the vortex length.

Other features which are considered as characteristic for the invention are set forth in the appended claims.

Although the invention is illustrated and described herein as embodied in method and device for flushing the inside surface of a pipe in the vicinity of a welded seam, it is nevertheless not intended to be limited to the details shown, since various modifications may be made therein without departing from the spirit of the invention and within the scope and range of equivalents of the claims.

BRIEF DESCRIPTION OF THE DRAWINGS

The brief description of the drawing invention, however, together with additional objects and advantages thereof will be best understood from the following description when read in connection with the accompanying drawings, in which.

DESCRIPTION OF THE PREFERRED EMBODIMENTS

Figure 1:
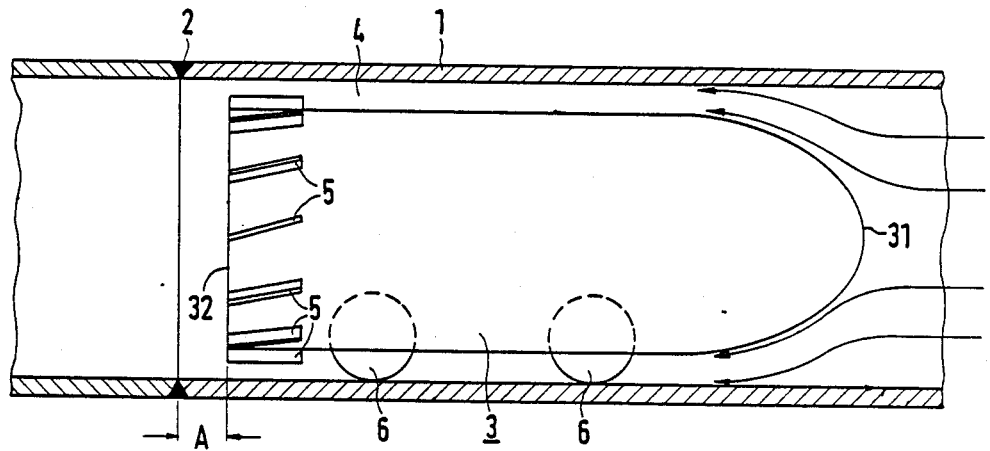
FIG. 1 schematically shows a pipe with a welded seam in which an aerodynamic body with an aerodynamic lead shape, a break away edge at the back, and baffles is arranged for flushing the inside surface of the pipe.

According to the invention, the problem of eliminating or substantially eliminating evaporation residues in the inside wall of a pipe next to a welded seam by flushing the inside of the pipe is solved by the provision that the laminar flow in the pipe ahead of the welded seam is changed into a turbulent flow.

Evaporation residues escaping from the liquid welding material at a welded seam are fanned up and subsequently flushed away.

A device for carrying out the method according to the invention comprises, for obtaining turbulent flow, an aerodynamic body which can be arranged in the pipe. Turbulence of the flushing gas is achieved by such an aerodynamic body positioned at a defined distance from the welded seam. The distance from the welded seam is chosen so that it is smaller than the vortex length which can be calculated. As a result it is impossible for any significant amount of evaporation residues to be deposited on the inside surface of the pipe especially in the vicinity of the welded seam.

The aerodynamic body is, for instance, cylindrical and has an aerodynamic leading shape in front as seen in the flow direction.

According to a first embodiment, the aerodynamic body is fitted into the pipe to leave a ring gap between the outer surface of the body and the inner surface of the pipe for flow therethrough of the flushing gas. The back of the aerodynamic body which is the opposite end of the front, as seen in the flow direction, has a breakaway edge.

With an aerodynamic body shaped in this manner, the advantage is obtained that residues can be flushed away without remainder by a relatively small quantity of flushing gas by the turbulence of the gas alone. Since only little flushing gas is required, for instance, argon, if the aerodynamic body is used, the flushing of the pipe is economical.

As seen in the flow direction, baffles are arranged at the end of the aerodynamic body at its circumference parallel to the axis of the pipe or tilted at an angle relative to the axis of the pipe.

By using an aerodynamic body equipped with baffles, the turbulence in the flow of the flushing gas is increased thereby further increasing the effectiveness of preventing precipitation of evaporation residues at a weld. Thereby, after the welding work is completed, the pipe is substantially free of impurities.

Rolls are arranged, at the circumference of the aerodynamic body, for instance, at a given angular spacing from each other which support the aerodynamic body movably on the inside surface of the pipe. One of the set of rolls is spring-supported. Advantages of the sets of rolls which are uniformly distributed over the circumference, are easy introduction of the aerodynamic body into the pipe, permissible movement therein and also ready removal from the pipe. In the process, the aerodynamic body is moved on the rolls from the outside by means of a rod. In addition, damage to the polished inside surface of the pipe is prevented by the support on the rolls when the aerodynamic body is moved. Due to the fact that one of the sets of rolls is spring-supported, exact centering in the pipe is assured. The pressure of the spring-loaded pair of rolls prevents shifting of the body during the welding process so that the aerodynamic body remains in the optimum position.

Another embodiment of the aerodynamic body provides that its diameter corresponds to the inside diameter of the pipe and that a groove in the manner of a screw thread, through which the flushing gas is conducted is located on the cylindrical surface of the aerodynamic body. Thereby, sufficient turbulence of the flushing gas is achieved without the employment of baffles. With this design, a relatively short overall length is sufficient, which makes possible the employment of the aerodynamic body in poorly accessible pipe sections as, for instance, at elbows and T-sections. In addition, low production costs accrue for the uncomplicated shape. The groove has, for instance, a trapezoidal cross section.

For positioning an aerodynamic body according to the second embodiment described, magnetizable parts are arranged at its circumference, for instance, iron parts which interact with holding magnets which can be attached outside the pipe. The iron parts are arranged in the aerodynamic body sunk close to its surface so that mechanical damage of the inside surface of the pipe is precluded. Instead of the iron parts, magnets can be inserted into the aerodynamic body where poles of the holding magnets outside the pipe and poles of the magnets in the aerodynamic body are opposite each other, and have different polarity.

A magnetic lock for the aerodynamic body has the advantage that the locking device can be switched on and off for short periods of time. While an aerodynamic body with the first embodiment can be moved, because of the roll friction, only via a mechanical connection in the pipe, a slight increase of the flushing gas pressure is sufficient in the second embodiment to move the aerodynamic body in the pipe after the holding magnet is switched off or removed.

The aerodynamic body according to the second embodiment can be produced even more simply and cost-effectively and can, in addition, be handled in the pipe more easily than the aerodynamic body according to the first embodiment.

A material suitable for fabricating an aerodynamic body is a hard wear-resistant plastic which is known. Such a plastic is easy to process and its surface structure is not changed even under mechanical stress. In order to keep the weight of the aerodynamic body small, it is designed, for instance, as a hollow body. The walls of the hollow body are thick enough to embed the iron parts therein.

With the invention, the advantage is achieved that in the welding of pipes which later are to transport very pure gases, high-quality welded seams free of evaporation residues are assured. A turbulent flushing gas flow generated at the weld in a targeted manner in accordance with the invention prevents depositions of evaporation residues of the melt bath there.

The invention will be explained in greater detail, making reference to the drawings.

Referring to FIG. 1, a flushing gas is fed with laminar flow to a pipe 1. An aerodynamic body 3 is arranged in the pipe at a fixed distance A in front of a welded seam 2, as seen in the flow direction, which is to keep two pipe sections together. The diameter of the aerodynamic body 3 is slightly smaller than the inside diameter of the pipe 1. Thereby, an annular gap 4 remains open. In front, as seen in the flow direction, the aerodynamic body 3 has an aerodynamic lead shape 31, is cylinder-shaped in the middle, and has a breakaway edge 32 in back. Baffles 5 are arranged in the vicinity of the breakaway edge 32 on the cylinder surface of the aerodynamic body 3, tilted at an angle against the pipe axis. The laminar flow of the flushing gas is transformed by the aerodynamic body 3 into a turbulent flow which fans up evaporation residues and deposits at the welded seam 2. The impurities are then flushed away with the flushing gas stream. The welded joint made using the aerodynamic body 3 in accordance with invention meets the requirements which are specified for pure-gas piping.

For supporting the aerodynamic body 3 on the inside surface of the pipe, three sets of rolls 6 of plastic are uniformly distributed over the circumference of the aerodynamic body 3, of which only one set of rolls 6 is shown. One set of rolls 6 is spring-supported to assure exact centering and positioning of the aerodynamic body 3 in the pipe 2 and, in addition, to avoid damage of the inside surface which normally in pure-gas pipes is polished. The aerodynamic body 3 is held in the pipe by friction forces and is introduced into the pipe and also removed from the pipe by means of a rod.

Figure 2:
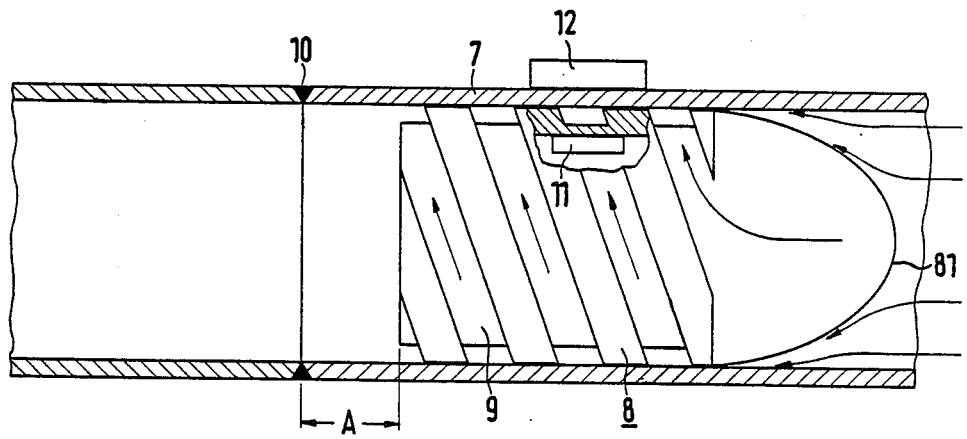
FIG. 2 shows a pipe with a welded seam, in which an aerodynamic body for flushing the inside surface of the pipe has a groove milled on the cylinder surface of the aerodynamic body in the form of a screw thread.

In FIG. 2 an aerodynamic body 8 which has an aerodynamic lead shape 81 is arranged in a pipe 7 in front of a welded seam 10 at a fixed distance A. The aerodynamic body 8 of FIG. 2 has a few features which deviate from the aerodynamic body 3 of FIG. 1 for the transition of a laminar flow into turbulent flow. The diameter of the cylindrical aerodynamic body 8 corresponds to the inside diameter of the pipe 7. A groove 9 is milled on the cylinder surface of the aerodynamic body 8 in the form of a screw thread. The flushing gas is conducted through this screw. A gas vortex which prevents deposits in the vicinity of the welded seam 10 is thereby generated behind the aerodynamic body 8 as seen in the flow direction. Iron parts 11 are arranged at the circumference of the aerodynamic body 8 and are embedded therein. These iron parts 11 cooperate with cup magnets 12 which can be positioned at the outside wall of the pipe 7. In this manner the aerodynamic body 8 is positioned at a definite point in the pipe 7 and is held there. With the holding magnet 12 switched off or removed, the aerodynamic body 8 can be moved by generating a slight pressure difference in the pipe 7. In the process, the relatively smooth surface of the aerodynamic body 8 slides on the polished inside surface of the pipe 7 with little friction.

The aerodynamic body 3, 8 is arranged in the pipe 1, 7 only during the welding operation. After a welded seam 2, 10 free of evaporation residues has been produced, the aerodynamic body 3, 8 is taken to the next weld or removed from the pipe 1, 7.

There is claimed:

1. Method for flushing the inside surface of a pipe in a welding procedure forming a welded seam joining pipe sections of the pipe which comprises, feeding a flushing gas into the pipe with laminar flow, and transforming the laminar flow into a turbulent flow in front of the seam to be welded as seen in the flow direction to effect removal by the turbulent flow of flushing gas of evaporation residue escaping from the liquid melt bath at the seam being welded and produce a pipe with a welded seam substantially free of impurities, the laminar flow being transformed into turbulent flow by arranging an aerodynamic body in front of the seam to be welded as seen in the flow direction, with the distance between the seam and the aerodynamic body smaller than the length of the vortex which is generated behind the aerodynamic body as seen in the flow direction.

2. An apparatus for use in a welding procedure of forming a welded seam joining pipe sections, wherein a flushing gas is fed through the pipe with laminar flow, comprising an aerodynamic body for transforming the laminar flow of the flushing gas to turbulent flow in front of the seam to be welded as seen in the flow direction, said turbulent flow comprising a vortex having a given length behind the aerodynamic body as seen in the flow direction, said aerodynamic body being arranged in front of the seam to be welded as seen in the flow direction with the distance between the seam to be welded and the aerodynamic body smaller than the length of the vortex.

3. Apparatus according to claim 2, wherein the aerodynamic body is cylindrical and the aerodynamic body has an aerodynamic lead shape in front as seen in the flow direction.

4. Apparatus according to claim 3, wherein the diameter of the aerodynamic body is slightly smaller than the inside diameter of the pipe leaving an annular open gap, and wherein the aerodynamic body has a breakaway edge in back as seen in the flow direction.

5. Apparatus according to claim 4, wherein baffles are arranged at the end of the aerodynamic body on its cylinder surface.

6. Apparatus according to claim 5, wherein the baffles are arranged tilted at an angle with respect to the pipe axis.

7. Apparatus according to claim 4, wherein rolls which support the aerodynamic body movably on the inside surface of the pipe are arranged at the circumference of the aerodynamic body.

8. Apparatus according to claim 7, wherein one set of rolls is spring-supported.

9. Apparatus according to claim 3, wherein the diameter of the aerodynamic body corresponds to the inside diameter of the pipe, and wherein a groove in the form of a screw thread is located on the cylinder surface of the aerodynamic body for conducting the flushing gas.

10. Apparatus according to claim 9, wherein the groove has a trapezoidal cross section.

11. Apparatus according to claim 9, wherein holding magnets are attached outside the pipe, and wherein iron parts are arranged at the cylindrical surface of the aerodynamic body, which interact with the holding magnets attached outside the pipe.

12. Apparatus according to claim 11, wherein the iron parts are embedded in the surface of the aerodynamic body.

13. Apparatus according to claim 2, wherein the aerodynamic body consists of plastic.

* * * * *

UNITED STATES PATENT OFFICE
CERTIFICATE OF CORRECTION

PATENT NO. : 4,757,935
DATED : Jul. 19, 1988
INVENTOR(S) : Gügel et al

It is certified that error appears in the above-identified patent and that said Letters Patent is hereby corrected as shown below:

In the Title Page, Item 75,
"Siegfried Gügel, Möhrendorf, Fed.Rep. of Germany"
should read
- - Siegfried Gügel, Möhrendorf; Jürgen Böhm, Erlangen, both of Federal Republic of Germany - - .

In the Title Page, below United States Patent (19)
"Gügel"
should read
- - Gügel et al - - .

Signed and Sealed this

Ninth Day of January, 1990

Attest:

JEFFREY M. SAMUELS

Attesting Officer     Acting Commissioner of Patents and Trademarks